April 7, 1959    G. A. DI NORSCIA    2,881,098
COATING PROCESS PREVENTING DISCOLORATION OF CHLOROSULFONATED
POLYOLEFIN POLYMER COATINGS BY VULCANIZATION
OF AN UNDER COAT OF SAME
Filed Nov. 14, 1956

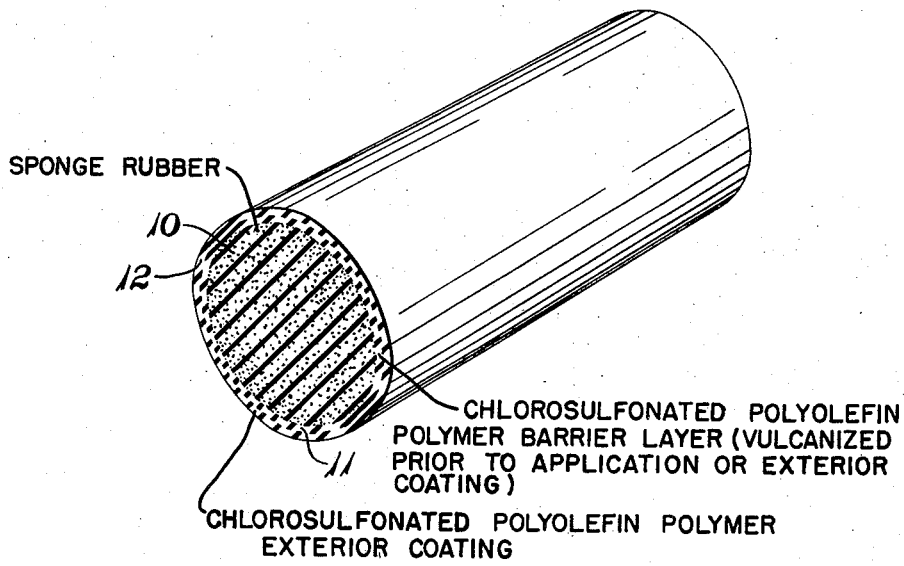

SPONGE RUBBER
10
12
CHLOROSULFONATED POLYOLEFIN POLYMER BARRIER LAYER (VULCANIZED PRIOR TO APPLICATION OR EXTERIOR COATING)
11
CHLOROSULFONATED POLYOLEFIN POLYMER EXTERIOR COATING

*INVENTOR.*
GAETANO A. DI NORSCIA
BY
*James R. Lindsay*
ATTY.

United States Patent Office 2,881,098
Patented Apr. 7, 1959

2,881,098

COATING PROCESS PREVENTING DISCOLORATION OF CHLOROSULFONATED POLYOLEFIN POLYMER COATINGS BY VULCANIZATION OF AN UNDERCOAT OF SAME

Gaetano A. Di Norscia, West Haven, Conn., assignor to The B. F. Goodrich Company, New York, N. Y., a corporation of New York Application November 14, 1956, Serial No. 622,167

13 Claims. (Cl. 117—162)

This invention relates to a process for applying a coating of chlorosulfonated polyolefin polymer over a substrate member and pertains more particularly to a process for coating a substrate member with a solution of chlorosulfonated polyolefin polymer.

Chlorosulfonated polyolefin polymer vulcanizates are extremely suitable for use as decorative and/or protective coatings because of the physical and chemical properties of such vulcanizates. In particular, chlorosulfonated polyolefin polymer vulcanizates are exceptionally resistant to deterioration resulting from exposure to ozone, heat, sunlight, oxidizing acids and alkalis, and can be formed in a wide variety of attractive colors. Although a calendered sheet of chlorosulfonated polyolefin polymer may be applied over a substrate member to form a coating thereon, usually it is more satisfactory and convenient to dissolve the chlorosulfonated polyolefin polymer in a suitable volatile solvent for the polymer to form a coating solution and to coat the substrate member by brushing or spraying the coating solution onto the substrate member or by dipping the substrate member into the coating solution. However, the use of such coating solutions for coating substrates that contain materials which cause chlorosulfonated polyolefin polymers to discolor has presented difficulties where discoloring of the coating is objectionable since the solvent of the coating solution has been permitted to penetrate into and dissolve discoloring materials from the substrate composition and deposit the dissolved materials throughout the chlorosulfonated polyolefin polymer coating. As a result, discoloration of the coating has occurred. The only method heretofore known for overcoming this difficulty has been to refrain from using materials in the substrate composition which would cause chlorosulfonated polyolefin polymers to discolor, even though the elimination of such materials from the substrate composition would adversely affect the physical properties of the substrate.

The present invention provides a solution to this difficulty which does not entail the elimination of compounding materials from the substrate composition. In accordance with this invention, one or more coats of coating solution containing chlorosulfonated polyolefin polymer are applied to the substrate member and the coatings are vulcanized. Thereafter, one or more additional coats of coating solution containing chlorosulfonated polyolefin polymer are applied over the vulcanized layer of chlorosulfonated polyolefin polymer previously coated on the substrate member and the subsequently applied coats of polymer then are vulcanized. It has been found that if the final coat or coats of the chlorosulfonated polyolefin polymer coating solution are applied over a stratum of chlorosulfonated polyolefin polymer vulcanizate previously formed over the substrate, the materials in the substrate which cause chlorosulfonated polyolefin polymers to discolor can not migrate into the coat or coats of chlorosulfonated polyolefin polymer applied over the stratum of vulcanized polymer and, as a result, discoloration of the latter applied coatings does not occur. The same result is not obtained by applying successive coats of chlorosulfonated polyolefin polymer coating solution over unvulcanized coats of the polymer.

Although this process may be used in coating any solid substrate material, the process is more useful for coating substrates that contain one or more materials which cause chlorosulfonated polyolefin polymers to discolor. The process is particularly useful in coating substrates made of plastic or natural or synthetic rubber, since most plastic compositions and natural and synthetic rubber compositions contain compounding components which cause chlorosulfonated polyolefin polymers to discolor. For example, many plasticizers, stabilizers and fillers used in plastic compositions and many antioxidants, accelerators, plasticizers, fillers and carbon blacks used in natural and synthetic rubber compositions cause discoloration of chlorosulfonated polyolefin polymers.

To illustrate this invention reference will be made to the accompanying drawing in which the single figure of the drawing is a perspective view of a section of cellular rubber substrate coated with chlorosulfonated polyolefin polymer composition. However, it will be understood that this invention is not intended to be limited to the specific illustration.

Referring to the drawing, a sponge rubber substrate 10 is coated with a barrier coating 11 comprised of a chlorosulfonated polyolefin polymer composition and an exterior coating 12 which also is comprised of a chlorosulfonated polyolefin polymer composition. Coating 11 functions as a barrier layer which prevents materials in the substrate composition from migrating into coating 12.

The sponge rubber substrate 10 is formed in a conventional manner. However, since the solvent or solvents used in the chlorosulfonated polyolefin polymer coating solutions may cause unvulcanized rubber compositions to swell, the sponge rubber composition of substrate 10 preferably is vulcanized before the first coating of chlorosulfonated polyolefin polymer coating solution is applied. Barrier coating 11 is formed over substrate 10 by brushing or spraying the chlorosulfonated polyolefin polymer coating solution onto substrate 10 or by dipping substrate 10 into the chlorosulfonated polyolefin polymer coating solution. If it is necessary to apply more than one coat of the coating solution to substrate 10 to form a coating 11 of desired thickness, a sufficient drying time should be allowed between each coat to permit the solvent to evaporate from each coat before the next coat is applied. After a desired thickness of chlorosulfonated polyolefin polymer composition has been deposited on substrate 10 to form coating 11, coating 11 preferably having a thickness of at least about .004 inch, the chlorosulfonated polyolefin polymer coating 11 is vulcanized in the usual manner, for example by heating the polymer for 10 to 45 minutes at 275 to 320° F. The vulcanization of coating 11 before forming coating 12 thereover prevents the migration of materials from either substrate 10 or coating 11 into coating 12.

Coating 12 then is formed over the vulcanized chlorosulfonated polyolefin polymer barrier coating 11 either by brushing or spraying chlorosulfonated polyolefin polymer coating solution over the barrier coating 11 or by dipping substrate 10 with barrier coating 11 thereon into the chlorosulfonated polyolefin polymer coating solution. The coating solution used in forming coating 12 may be the same as used to form coating 11, or the composition may be different. If more than one coat of coating solution is necessary to form a coating 12 of desired thickness, a sufficient drying time should be allowed between each coat of coating solution to permit the solvent to evaporate from each deposited coat before the next coat is applied. The thickness of coating 12 preferably is at least .004 inch. After coating 12 has been formed over coating 11, coating 12 is vulcanized in the usual manner.

The chlorosulfonated polyolefin polymer used in the coating solutions from which barrier coating 11 and exterior or finish coating 12 are formed will vary depending upon the properties desired in the coatings. The properties of the polymer are influenced mainly by the molecular weight of the polymer, the chlorine content of the polymer and the number of sulfonyl chloride groups present in the polymer chain. Chlorosulfonated polyolefin polymers which have an average molecular weight of at least about 15,000, a chlorine content of about 20 to 40 percent and a sulfur content as sulfonyl chloride of about 1.0 to 2.0 percent produce coatings which have especially suitable properties. The chlorosulfonated polyethylene polymers having an average molecular weight of about 20,000 and containing about 1.3 to 1.7 percent sulfur as sulfonyl chloride and about 26 to 29 percent combined chlorine are particularly useful for producing coatings from solutions of the polymers.

The chlorosulfonated polyolefin polymer coating solutions from which barrier coating 11 and finish coating 12 are formed are formulated in the usual manner by dissolving a chlorosulfonated polyolefin polymer or a blend of such polymers in a suitable volatile solvent for the polymer or polymers. Among the solvents which may be used to dissolve such polymers are aromatic hydrocarbon solvents such as toluene, xylene, naphthalene and benzene and liquid chlorinated hydrocarbons such as carbon tetrachloride. Mineral spirits having a high aromatic hydrocarbon content also are suitable. Blends of aromatic hydrocarbon solvents with ketones or alcohols are useful for dissolving chlorosulfonated polyolefin polymers if the blends contain at least about 75 percent of the aromatic hydrocarbon solvent. The amount of solvent used in the coating solution will vary depending upon the degree of fluidity desired in the coating solution. Coating solutions having a solids content between about 5 and 30 percent possess viscosities particularly suitable for solution coating. Materials normally compounded with chlorosulfonated polyolefin polymers such as vulcanizing (curing) agents, stabilizers, accelerators, fillers, etc. are added to the coating solution in the usual manner, and suitable coloring pigments are included in at least the coating solution used for forming exterior coating 12.

The following examples are intended merely to illustrate this invention and are not intended to limit the scope of the invention.

*Example I*

A substrate comprising a vulcanized natural rubber composition was coated with a chlorosulfonated polyethylene polymer coating solution of the following composition:

| Material: | Parts by weight |
|---|---|
| Chlorosulfonated polyethylene polymer (Hypalon 20 [1] sold by E. I. du Pont de Nemours and Company) | 100.0 |
| Hydrogenated wood Rosin (Staybelite Resin sold by Hercules Powder Co.) | 6.0 |
| Precipitated whiting | 50.0 |
| Tribasic lead maleate | 40.0 |
| Phthalic acid | 3.0 |
| Tetramethyl thiuram disulfide | 2.0 |
| Titanium dioxide (coloring pigment) | 15.0 |
| Toluene | 500.0 |
| Butanol | 100.0 |

[1] Hypalon 20 is a chlorosulfonated polyethylene polymer having an average molecular weight of about 20,000, a sulfur content as sulfonyl chloride of about 1.25% and a chlorine content of about 29%.

The substrate was coated with two coats of the coating solution with a 10 minute drying period between the first and second coats. The coated substrate then was heated in a hot air oven for 30 minutes at 200° F. to effect vulcanization of the chlorosulfonated polyethylene polymer coating over the substrate. Two additional coats of the coating solution then were applied over the vulcanized chlorosulfonated polyethylene polymer coating previously formed over the substrate with a ten-minute drying period between these latter applied coats, and the coated substrate was heated to 275° F. for 30 minutes in an air oven to vulcanize the latter applied coats of chlorosulfonated polyethylene polymer.

*Example II*

A wood substrate was coated with a chlorosulfonated polyethylene polymer coating solution of the following composition:

| Material: | Parts by weight |
|---|---|
| Chlorosulfonated polyethylene polymer (Hypalon S-2 [1] sold by E. I. du Pont de Nemours and Company) | 100.0 |
| Hydrogenated wood rosin (Staybelite Resin sold by Hercules Powder Co.) | 5.0 |
| Precipitated whiting | 50.0 |
| Light calcined magnesia | 20.0 |
| Phthalic acid | 2.0 |
| Tetramethyl thiuram disulfide | 2.0 |
| Red iron oxide (coloring pigment) | 10.0 |
| Toluene | 525.0 |
| Butanol | 100.0 |

[1] Hypalon S-2 is a chlorosulfonated polyethylene polymer having an average molecular weight of about 20,000, a sulfur content as sulfonyl chloride of about 1.3 to 1.7% and a chlorine content of about 26 to 29%.

A coat of the chlorosulfonated polyethylene polymer coating solution was applied to the wood substrate and the coated substrate was heated in an air oven for 15 minutes at 250° F. to vulcanize the coating. A second coat of the coating solution then was applied over the coating of chlorosulfonated polyethylene polymer already formed on the wood substrate and the second coating of chlorosulfonated polyethylene polymer was vulcanized by heating the coated substrate in an air oven for 25 minutes at 295° F.

It is clear that obvious variations and modifications of this invention may be made without departing from the spirit and scope of this invention as defined in the appended claims.

I claim:

1. A process for coating a substrate member with chlorosulfonated polyolefin polymer which comprises forming coating solution comprising chlorosulfonated polyolefin polymer dissolved in a volatile solvent for said polymer, applying at least one coat of said coating solution to said substrate member to deposit a coating of chlorosulfonated polyolefin polymer on said substrate member, vulcanizing said coating of chlorosulfonated polyolefin polymer on said substrate member, applying at least one addition coat of said coating solution over said coating of chlorosulfonated polyolefin polymer previously applied to said substrate member to deposit a second coating of chlorosulfonated polyolefin polymer over the substrate member, and vulcanizing said second coating of chlorosulfonated polyolefin polymer applied over the substrate member.

2. A process for coating a substrate member with chlorosulfonated polyolefin polymer which comprises forming coating solution comprising chlorosulfonated polyolefin polymer dissolved in a volatile solvent for said polymer, said polymer having an average molecular weight of at least 15,000, a combined chlorine content of about 20 to 40 percent and a sulfur content as sulfonyl chloride of about 1.0 to 2.0 percent, applying at least one coat of said coating solution to said substrate member to deposit a coating of chlorosulfonated polyolefin polymer on said substrate member, vulcanizing said coating of chlorosulfonated polyolefin polymer on said substrate member, applying at least one additional coat of said coating solution over said coating of chlorosulfonated polyolefin polymer previously applied to said substrate member to deposit a second coating of chlorosulfonated polyolefin polymer over the substrate member, and vulcanizing said second coating of chlorosulfonated polyolefin polymer applied over the substrate member.

3. A process for coating a substrate member with chlorosulfonated polyolefin polymer which comprises forming coating solution comprising chlorosulfonated polyolefin polymer dissolved in a volatile solvent for said polymer, coating said substrate member with a coating of chlorosulfonated polyolefin polymer at least about .004 inch thick by applying at least one coat of said coating solution to said substrate member, vulcanizing said coating of chlorosulfonated polyolefin polymer on said substrate member, applying at least one additional coat of said coating solution over said coating of chlorosulfonated polyolefin polymer previously applied to said substrate member to deposit a second coating of chlorosulfonated polyolefin polymer over the substrate member, and vulcanizing said second coating of chlorosulfonated polyolefin polymer applied over the substrate member.

4. A process for coating a substrate member with chlorosulfonated polyolefin polymer which comprises forming coating solution comprising chlorosulfonated polyolefin polymer dissolved in a volatile solvent for said polymer, coating said substrate member with a coating of chlorosulfonated polyolefin polymer at least about .004 inch thick by applying at least one coat of said coating solution to said substrate member, vulcanizing said coating of chlorosulfonated polyolefin polymer on said substrate member, coating said substrate member with a second coating of chlorosulfonated polyolefin polymer at least about .004 inch thick by applying at least one additional coat of said coating solution over said coating of chlorosulfonated polyolefin polymer previously applied to said substrate member, and vulcanizing said second coating of chlorosulfonated polyolefin polymer applied over the substrate member.

5. A process for coating a substrate member with chlorosulfonated polyolefin polymer which comprises forming coating solution comprising chlorosulfonated polyolefin polymer dissolved in a volatile solvent for said polymer, said polymer having an average molecular weight of at least 15,000, a combined chlorine content of about 20 to 40 percent and a sulfur content as sulfonyl chloride of about 1.0 to 2.0 percent, coating said substrate member with a coating of chlorosulfonated polyolefin polymer at least about .004 inch thick by applying at least one coat of said coating solution to said substrate member, vulcanizing said coating of chlorosulfonated polyolefin polymer on said substrate member, coating said substrate member with a second coating of chlorosulfonated polyolefin polymer at least about .004 inch thick by applying at least one additional coat of said coating solution over said coatnig of chlorosulfonated polyolefin polymer previously applied to said substrate member, and vulcanizing said second coating of chlorosulfonated polyolefin polymer applied over the substrate member.

6. A process for coating a substrate member with chlorosulfonated polyethylene polymer which comprises forming coating solution comprising chlorosulfonated polyethylene polymer dissolved in a volatile solvent for said polymer, applying at least one coat of said coating solution to said substrate member to deposit a coating of chlorosulfonated polyethylene polymer on said substrate member, vulcanizing said coating of chlorosulfonated polyethylene polymer on said substrate member, applying at least one additional coat of said coating solution over said coating of chlorosulfonated polyethylene polymer previously applied to said substrate member to deposit a second coating of chlorosulfonated polyethylene polymer over the substrate member, and vulcanizing said second coating of chlorosulfonated polyethylene polymer applied over the substrate member.

7. A process for coating a substrate member with chlorosulfonated polyethylene polymer which comprises forming coating solution comprising chlorosulfonated polyethylene polymer dissolved in a volatile solvent for said polymer, said polymer having an average molecular weight of at least 15,000, a combined chlorine content of about 20 to 40 percent and a sulfur content as sulfonyl chloride of about 1.0 to 2.0 percent, applying at least one coat of said coating solution to said substrate member to deposit a coating of chlorosulfonated polyethylene polymer on said substrate member, vulcanizing said coating of chlorosulfonated polyethylene polymer on said substrate member, applying at least one additional coat of said coating solution over said coating of chlorosulfonated polyethylene polymer previously applied to said substrate member to deposit a second coating of chlorosulfonated polyethylene polymer over the substrate member, and vulcanizing said second coating of chlorosulfonated polyethylene polymer applied over the substrate member.

8. A process for coating a substrate member with chlorosulfonated polyethylene polymer which comprises forming a coating solution comprising chlorosulfonated polyethylene polymer dissolved in a volatile solvent for said polymer, coating said substrate member with a coating of chlorosulfonated polyethylene polymer at least about .004 inch thick by applying at least one coat of said coating solution to said substrate member, vulcanizing said coating of chlorosulfonated polyethylene polymer on said substrate member, applying at least one additional coat of said coating solution over said coating of chlorosulfonated polyethylene polymer previously applied to said substrate member to deposit a second coating of chlorosulfonated polyethylene polymer over the substrate member, and vulcanizing said second coating of chlorosulfonated polyethylene polymer applied over the substrate member.

9. A process for coating a substrate member with chlorosulfonated polyethylene polymer which comprises forming a coating solution comprising chlorosulfonated polyethylene polymer dissolved in a volatile solvent for said polymer, coating said substrate member with a coating of chlorosulfonated polyethylene polymer at least about .004 inch thick by applying at least one coat of said coating solution to said substrate member, vulcanizing said coating of chlorosulfonated polyethylene polymer on said substrate member, coating said substrate member with a second coating of chlorosulfonated polyethylene polymer at least about .004 inch thick by applying at least one additional coat of said coating solution over said coating of chlorosulfonated polyethylene polymer previously applied to said substrate member, and vulcanizing said second coating of chlorosulfonated polyethylene polymer applied over the substrate member.

10. A process for coating a substrate member with a coat of polyethylene coated polymer which comprises forming a coating solution comprising chlorosulfonated polyethylene polymer dissolved in a volatile solvent for said polymer, said polymer having an average molecular weight of at least 15,000, a combined chlorine content of about 20 to 40 percent and a sulfur content of sulfonyl chloride of about 1.0 to 2.0 percent, coating said substrate member with a coating of chlorosulfonated polyethylene polymer at least about .004 inch thick by applying at least one coat of said coating solution to said substrate member, vulcanizing said coating of chlorosulfonated polyethylene polymer on said substrate member, coating said substrate member with a second coating of chlorosulfonated polyethylene polymer at least about .004 inch thick by applying at least one additional coat of said coating solution over said coating of chlorosulfonated polyethylene polymer previously applied to said substrate member, and vulcanizing said second coating of chlorosulfonated polyethylene polymer applied over the substrate member.

11. A process for coating a substrate member with chlorosulfonated polyethylene polymer which comprises forming a coating solution comprising chlorosulfonated polyethylene polymer dissolved in a volatile solvent for said polymer, said polymer having an average molecular weight of about 20,000, a combined chlorine content of about 26 to 29 percent and a sulfur content as sulfonyl chloride of about 1.3 to 1.7 percent, applying at least one coat of said coating solution to said substrate member to deposit a coating of chlorosulfonated polyethylene polymer on said substrate member, vulcanizing said coating of chlorosulfonated polyethylene polymer on said substrate member, applying at least one additional coat of said coating solution over said coating of chlorosulfonated polyethylene polymer previously applied to said substrate member to deposit a second coating of chlorosulfonated polyethylene polymer over the substrate member, and vulcanizing said second coating of chlorosulfonated polyethylene polymer applied over the substrate member.

12. A process for coating a substrate member with chlorosulfonated polyethylene polymer which comprises forming coating solution comprising chlorosulfonated polyethylene polymer dissolved in a volatile solvent for said polymer, said polymer having an average molecular weight of about 20,000, a combined chlorine content of about 26 to 29 percent and a sulfur content as sulfonyl chloride of about 1.3 to 1.7 percent, coating said substrate member with a coating of chlorosulfonated polyethylene polymer at least about .004 inch thick by applying at least one coat of said coating solution to said substrate member, vulcanizing said coat of chlorosulfonated polyethylene polymer on said substrate member, applying at least one additional coat of said coating solution over said coating of chlorosulfonated polyethylene polymer previously applied to said substrate member to deposit a second coating of chlorosulfonated polyethylene polymer over the substrate member, and vulcanizing said second coating of chlorosulfonated polyethylene polymer applied over the substrate member.

13. A process for coating a substrate member with chlorosulfonated polyethylene polymer which comprises forming a coating solution comprising chlorosulfonated polyethylene polymer dissolved in a volatile solvent for said polymer, said polymer having an average molecular weight of about 20,000, a combined chlorine content of about 26 to 29 percent and a sulfur content as sulfonyl chloride of about 1.3 to 1.7 percent, coating said substrate member with a coating of chlorosulfonated polyethylene polymer at least about .004 inch thick by applying at least one coat of said coating solution to said substrate member, vulcanizing said coating of chlorosulfonated polyethylene polymer on said substrate member, coating said substrate member with a second coating of chlorosulfonated polyethylene polymer at least about .004 inch thick by applying at least one additional coat of said coating solution over said coating of chlorosulfonated polyethylene polymer previously applied to said substrate member, and vulcanizing said second coating of chlorosulfonated polyethylene polymer applied over the substrate member.

References Cited in the file of this patent

UNITED STATES PATENTS

| | | |
|---|---|---|
| 1,500,097 | Abraham | July 8, 1934 |
| 2,630,398 | Brooks et al. | Mar. 3, 1953 |
| 2,678,287 | Cupery et al. | May 11, 1954 |
| 2,748,027 | Meier | May 29, 1956 |
| 2,809,950 | Bowers | Oct. 15, 1957 |

OTHER REFERENCES

The Complete Book of Furniture Repair and Refinishing, Kinney, 1950, Charles Scribner's Sons (N.Y.), page 116.